United States Patent [19]

Oxford

[11] Patent Number: 5,577,044
[45] Date of Patent: *Nov. 19, 1996

[54] ENHANCED SERIAL DATA BUS PROTOCOL FOR AUDIO DATA TRANSMISSION AND RECEPTION

[75] Inventor: William V. Oxford, San Jose, Calif.

[73] Assignee: Apple Computer, Inc., Cupertino, Calif.

[*] Notice: The term of this patent shall not extend beyond the expiration date of Pat. No. 5,532,556.

[21] Appl. No.: 212,504

[22] Filed: Mar. 11, 1994

Related U.S. Application Data

[63] Continuation-in-part of Ser. No. 314,538, Sep. 28, 1994, which is a continuation of Ser. No. 881,842, May 12, 1992, abandoned.

[51] Int. Cl.$^6$ ........................................................ H04J 3/06
[52] U.S. Cl. ............................. 370/85.11; 370/105.1; 370/110.1; 364/240.2; 364/240.8
[58] Field of Search .............................. 370/79, 85.1, 29, 370/85.2, 85.7, 85.9, 85.11, 100.1, 105.1, 105.2, 105.4, 105.5, 110.1; 375/257, 286, 288, 293, 355, 356; 364/238, 239.9, 240, 240.2, 240.8, 242.94, 242.95, 242.96, 242.5

[56] References Cited

U.S. PATENT DOCUMENTS

| | | | |
|---|---|---|---|
| 4,213,011 | 7/1980 | Hoelzl et al. | 370/105.4 |
| 4,229,816 | 10/1980 | Breidenstein et al. | 370/100.1 |
| 4,774,704 | 9/1988 | Gass et al. | 370/29 |
| 5,214,705 | 5/1993 | Kloker et al. | 370/110.1 X |

*Primary Examiner*—Alpus H. Hsu
*Assistant Examiner*—Russell W. Blum
*Attorney, Agent, or Firm*—Blakely, Sokoloff, Taylor & Zafman

[57] ABSTRACT

A protocol for transferring audio data and control/status data between audio functional units. The protocol involves multiplexing the audio data and control/status data. The multiplexed data is then transferred between a first audio unit and a second audio unit on two wires, each corresponding to the direction of data flow, and according to a clock and a synchronization pattern on third and fourth wires respectively.

25 Claims, 4 Drawing Sheets

DIAGRAM OF A SINGLE FRAME WITH FOUR SUBFRAMES

FS = FRAME SYNC
WS = WORD SYNC

ENHANCED SERIAL DATA BUS PROTOCOL FOR AUDIO DATA TRANSMISSION AND RECEPTION

This is a Continuation-In-Part of U.S. patent application Ser. No. 08/314,538, filed Sep. 28, 1994, pending, and entitled "Multiplexed Digital Audio and Control/Status Serial Protocol", which is a Continuation of U.S. patent application Ser. No. 08/881,842, filed May 12, 1992, abandoned, and entitled "Multiplexed Digital Audio and Control/Status Serial Protocol".

FIELD OF THE INVENTION

The present invention relates to the field of audio signal processing; in particular, the present invention relates to protocols utilized to transfer data between the signal processing hardware and the audio devices, or between two audio functional units.

BACKGROUND OF THE INVENTION

Today, signal processing is performed on a wide range of computer systems. The range of signal types processed by such computer systems include audio signals. The source of these audio signals could be a microphone, a sound playback machine, etc. The processing of these audio signals is usually accomplished using a separate signal processing chip. The signal processing chips operate on the audio signals through the use of audio data converters, which receive the audio signals and put them in a form upon which the signal processing chip can operate.

Audio data converters typically only serve the function of providing conversions from an audio signal format into a bit format on which the signal processing chips on a computer system can act. Additional functions such as output gain, input gain, muting, filtering, and sample rate selection are usually performed using external circuitry and not the audio data converters. Other functions such as overflow protection, error detection, and I/O bit operations are incorporated into some converter chips of the prior art. Typically, the reason for the exclusion of the additional functions on the converter chips is due to the fact that the converter chips are expensive in themselves and additional features would only add to their overall expense.

The transfer of data between the converter chips and the signal processing chips is usually accomplished according to a distributed algorithm, known as a protocol. The protocol interconnects the audio processing system to the audio data converters in a manner which allows each to communicate in a recognizable manner. Thus, the protocol allows the audio processing system and the audio data converters to interact in a cohesive way.

When data is transferred between the audio data converters and the audio processing system, data is typically transferred between ports on the audio processing chip and on the audio data converter chip. One prior art technique for transferring data between the audio data converters and the audio processing system involves the use of two separate serial ports. One of the serial ports is used for transfers of data in the form of a bitstream. The other serial port is used for sending control signals to the external circuitry which would perform output and input gain, muting, filtering, and sample rate selection, etc., since these functions are not typically performed by the audio converter chips. Information indicating the status of these operations would be returned on this serial port from the external circuitry. Thus, the control and status information are transferred on the second serial port coupled between the audio processing chip and external circuitry. Another prior art method also uses a serial port for transferring audio data. However, one or more parallel ports are also employed to provide parallel bits (i.e., pins on the package) for manipulating some external functions.

Another prior art method of transferring data between audio converters and the audio processing system is the AES/EBU protocol. The AES/EBU protocol interconnects digital audio devices using a serial port. Some of the bits in the bit stream transferred on the serial port contain status information. This information usually involves error correction and mode, but not control information. Furthermore, the AES/EBU protocol is utilized for interconnecting equipment to equipment in a uni-directional interface, such that the information is only transferred one direction.

One problem with prior art protocols is that when sending control information, bits have fixed meanings. That is, a separate bit (or bits) is either set or not in the serial bit stream to indicate to the device receiving the control information what functions are to be performed. If output gain control is desired, a particular bit is set. Similarly, if a muting is desired, a different bit is set. The same fixed bit format is used when requesting status information. Depending on what status information is required, a particular bit in the serial bit stream is set. This type of fixed bit format only supports a limited range of devices. As long as the control and status information is understood by a device, then it can use the protocol. Any other devices wishing to employ the protocol are limited to communicating the same control and status information. A device having additional functions or status available could not use the fixed bit format to access the additional information or provide the additional control. Additional control and status information not supported by the protocol would be transmitted through other means, such as additional pins. However, many different devices utilize a wide range of control functions. Therefore, many extra pins or other hardware would be required to allow all of the control and status information to be transmitted between devices. These additional required hardware devices can increase the cost and complexity of the system, which system designers and manufacturers wish to avoid. Thus, it is desirable to provide a protocol that is flexible enough to support a variety of devices to communicate control and status information specific to the devices employing the protocol, while not increasing the complexity of the protocol or the system.

As will be shown, the present invention involves a protocol for transferring data between an audio digital processing system and an audio data converter system. The protocol includes the transferring of multiplexed digital audio data and control/status information serially. Thus, protocol of the present invention transfers digital audio and control/status information serially on the same interconnection between the audio signal processing and audio data converters of a computer sound subsystem.

SUMMARY OF THE INVENTION

A method and apparatus for transferring data between multiple audio functional units is described. The present invention includes a method and apparatus for combining audio data and a predetermined number of bits of auxiliary data. In the present invention, the predetermined number of bits are set into one of a variable number of bit combinations to specify a transaction between audio functional units. The present invention also includes a method and apparatus for transferring the combined data on a first connection path (e.g., wire).

The present invention also provides for sending combined data on a second connection path (e.g., wire), except the combined data is transmitted in the opposite direction to the combined data on the first connection path In one embodiment, the combined data is sent according to a clock on a third connection path and a synchronization pulse on a fourth connection path.

BRIEF DESCRIPTION OF DRAWINGS

The present invention will be understood more fully from the detailed description given below and from the accompanying drawings of the preferred embodiment of the invention, which, however, should not be taken to limit the invention to the specific embodiments, but are for explanation and understanding only.

DETAILED DESCRIPTION OF THE INVENTION

A multiplexed digital audio and control/status serial protocol is described. In the following description, numerous specific details are set forth, such as specific clock rates, numbers of bytes, bits, wires, etc., in order to provide a thorough understanding of the preferred embodiment of the present invention. It will be apparent to one skilled in the art that the present invention may be practiced without these specific details. Also, well-known circuits have been shown in block diagram form, rather than a detail, in order to avoid unnecessarily obscuring the present invention.

In addition, in describing the present invention, reference is made to signal names peculiar to the currently preferred embodiment. Reference to these specific signal names should not be construed as a limitation on the spirit or scope of the present invention.

Overview of the Computer System of the Present Invention

Figure 1:
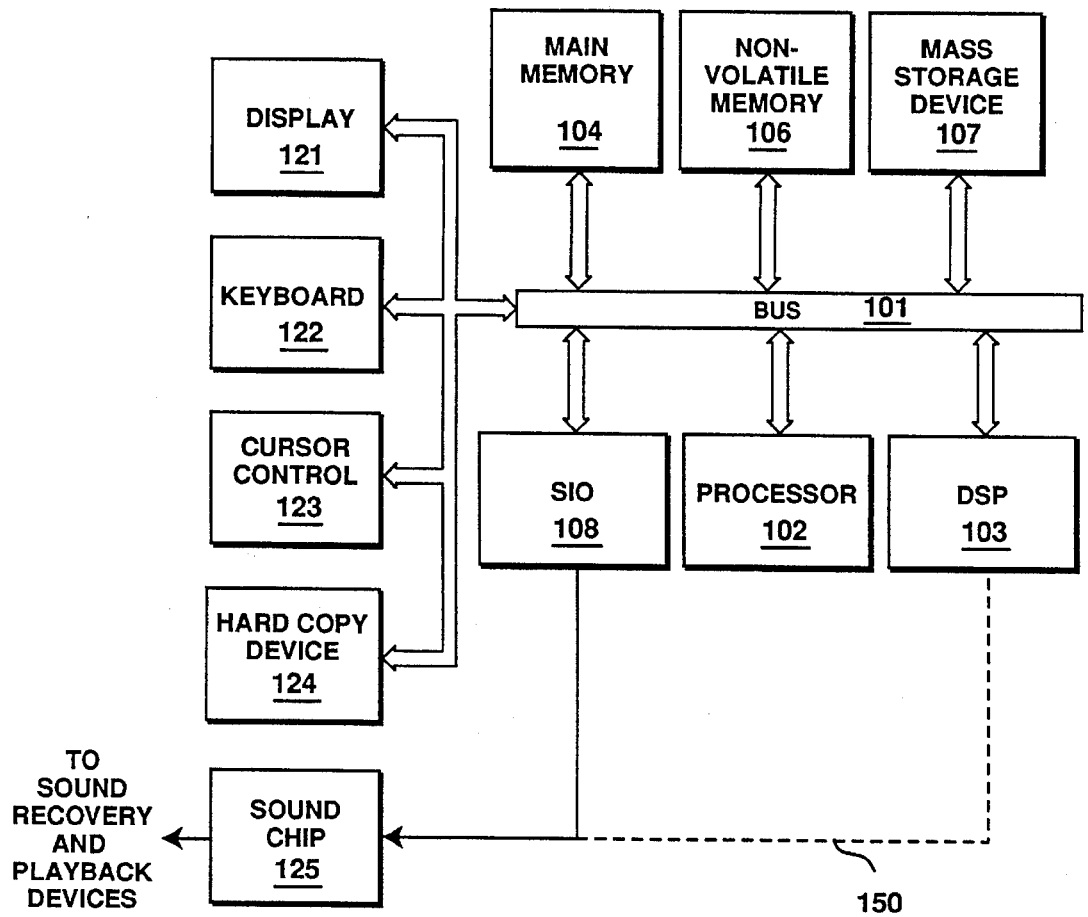
FIG. 1 is a block diagram of the computer system of the present invention.

Referring to FIG. 1, an overview of a computer system of the present invention is shown in block diagram form. It will be understood that while Figure 1 is useful for providing an overall description of the computer system of the present invention, a number of details of the System are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

The present invention may be implemented on a general purpose microcomputer, such as one of the members of the Apple Macintosh™ family, one of the members of the IBM personal computer family, or one of several audio computer devices which are presently commercially available. Of course, the present invention may also be implemented on a multi-user system while encountering all of the costs, speed, and function advantages and disadvantages available with these machines. The preferred embodiment of the present invention is implemented on an Apple Macintosh™ computer system developed by the assignee of the present invention.

As illustrated in FIG. 1, the computer system of the present invention generally comprises a bus or other communication means 101 for communicating information, a processor 102 coupled with bus 101 for processing information, an optional digital signal processor 103 for processing audio information, a random access memory (RAM) or other dynamic storage device 104 (commonly referred to as a main memory) coupled with bus 101 for storing information and instructions for processor 102 and digital signal audio processor 103, and a read-only memory (ROM) or other non-volatile storage device 106 coupled with bus 101 for storing non-volatile information and instructions for processor 102 and digital signal processor 103. The computer system also includes a serial input/output (I/O) interface (SIO) 108 for providing a data interface from sound chip 125. In the currently preferred embodiment, SIO 108 is contained within a direct memory access (DMA) chip. However, it should be noted that SIO 108 could also be part of the digital signal processor 103 or of processor 102. This alternate configuration is indicated by the dotted line connection 150 between digital signal processor 103 and sound chip 125.

The computer system of the present invention also includes a data storage device 107, such as a magnetic tape and disk drive, coupled with bus 101 for storing information and instructions, a display device 1 21, such as a cathode ray tube, liquid crystal display, etc., coupled to bus 1 01 for displaying information to the computer user, an alpha-numeric input device 122 including alpha-numeric and other keys, etc., coupled to bus 101 for communicating information and command selections to processor 102 and audio-processor (DSP) 103 (i.e., an audio functional unit), and a cursor control 123 for controlling cursor movement.

The system also includes a hard copy device 124, such as a plotter or printer, for providing a visual representation of the computer images. Hard copy device 124 is coupled with processor 102, audio-processor 103, main memory 104, non-volatile memory 106 and mass storage device 107 through bus 101. Finally, the system includes a sound chip 125 for providing audio recording and play back devices.

Of course, certain implementations and uses of the present invention may neither require nor include all of the above components. For example, in certain implementations a keyboard or cursor control device for inputting information to the system may not be required. In other implementations, it may not be required to provide a display device displaying information. A digital signal processor is also not required if processor 102 is capable of providing the desired audio processing. Furthermore, the computer system may have more than one digital signal processor.

Overview of the Sound Subsystem

Figure 2:
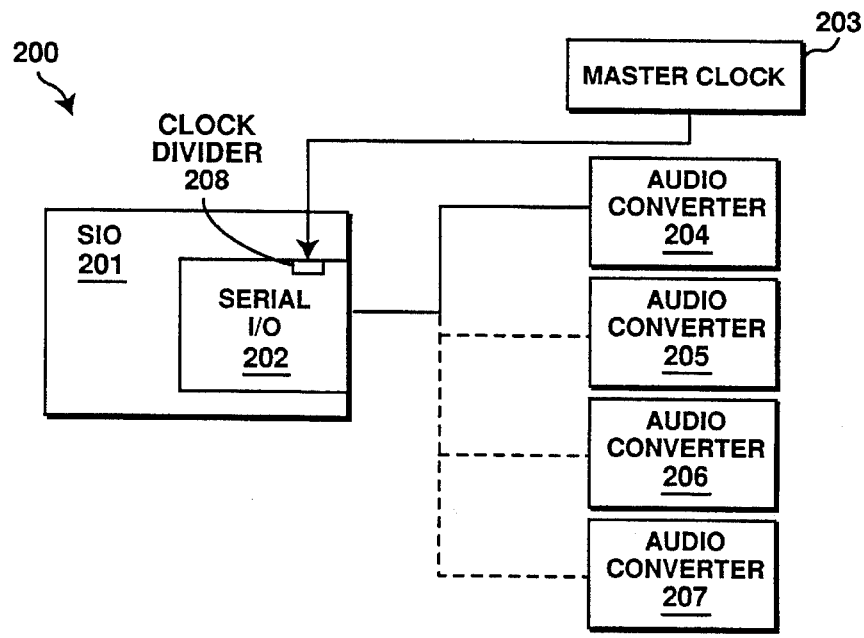
FIG. 2 is a block diagram of the sound subsystem of the present invention.

FIG. 2 shows in the currently preferred embodiment of the sound subsystem of the computer system of FIG. 1. Referring to FIG. 2, serial I/O interface (SIO) 201 is coupled to audio converters 204–207 as a data interface to audio devices coupled between the system bus 101 and each of audio converters 204–207. Although the currently preferred embodiment operates with a computer which does not include a separate DSP chip, the present invention can operate on any computer system which contains the proper interface support circuitry. SIO 201 is clocked by master clock 203. The audio converters referred to herein include those functional units commonly referred to as codecs. Note that the present invention would operate with any audio functional unit.

SIO 201 is coupled to audio converters 204–207 via its serial input/output (I/O) interface 202. In the currently preferred embodiment, serial interface 202 is coupled to each of the audio converters 204–207 using four wires. It should be noted that the present invention can operate with any number of audio converters. Also coupled to each of audio converters 204–207 are sound recording and playback devices (not shown). These devices are typically speaker or headphone amplifiers and microphone preamplifiers.

The basic sound subsystem of the present invention performs several functions. These functions are providing a connection for the input data stream (e.g., from a microphone or line), generating the underlying output stream, and processing and moving the final output stream to the proper I/O device (e.g., speaker).

In order to implement these functions, SIO 201 provides real-time functionality for the computer system (FIG. 1) by dividing its operating time into "frames" of equal length. In the currently preferred embodiment, the length of a frame in terms of time is derived from the clocking signal output from master clock 203. In the currently preferred embodiment, master clock 203 generates a 12.288 MHz clock signal. In one embodiment, the 12.288 MHz signal is also fed to each of the audio converters 204–207 as its master clock signal. In the preferred embodiment, audio converters 204–207 are clocked using a clock signal on one of the four wires coupling audio converters 204–207 to SIO 201.

SIO 201 includes clock divider 208 which is clocked by master clock 203. Divider 208 produces the frame synchronization signal for the serial bit stream between SIO 201 and audio converters 204–207.

In the currently preferred embodiment, the bit stream which is transferred according to the clock signal is formatted in frames. Each frame is further divided into subframes. In the currently preferred embodiment, there are four subframes in a frame. Each of audio converters 204–207 (i.e., audio functional units) is tuned into one of the subframes. In other words, audio converters 204–207 receive and send audio data according to the serial protocol in timing with the subframe that the individual audio converter is tuned. For example, if audio converter 204 is tuned to the first subframe, it transmits data only during the first subframe and may receive data from any subframe. It is possible that more than one of audio converters 204–207 is tuned into the same subframe, but only one device may be actively transmitting data during each subframe.

To input and output data to audio converters 204–207, SIO 201 utilizes sound input and output buffers (not shown). These buffers are managed by the computer system as a means of controlling the flow of audio data into and out of the processing units (e.g., DSP or main processor).

Audio converters 204–207 receive and utilize the sound input and output. Each of audio converters 204–207 accommodates up to 20-bits of left-justified sound data through the use of the serial interface protocol of the present invention. The computer system (FIG. 1) interfaces with audio converters 204–207 via the serial protocol and transfers sound data out to and in from each of the audio converters 204–207.

Audio converters 204–207 convert stereo audio signals from analog format into 16-bit digital format, and vice-versa. Each of audio converters 204–207 includes all the required digital filtering, input multiplexors, input and output gain control, and muting circuitry, which is typically found in external circuitry in prior art sound systems. The currently preferred embodiment of the audio converters of the present invention provides an input multiplexor, input gain block, over-sampling analog to digital converters, digital decimation filtering, serial I/O control timing, digital bit I/O frame selection, power down control, output over-sampling filter, over-sampling digital to analog converters, output attenuation, and output muting. In addition, each of audio converters 204–207 have a set of digital control pins for control of or sensing external circuits, such as telephone line status, etc. In the currently preferred embodiment, audio converters 204–207 can operate at sampling rates from 7,200 Hz (e.g., modem rates) to 48,000 Hz (e.g., pro-audio rates).

The Operation of the Stereo Audio Converter

Figure 3:
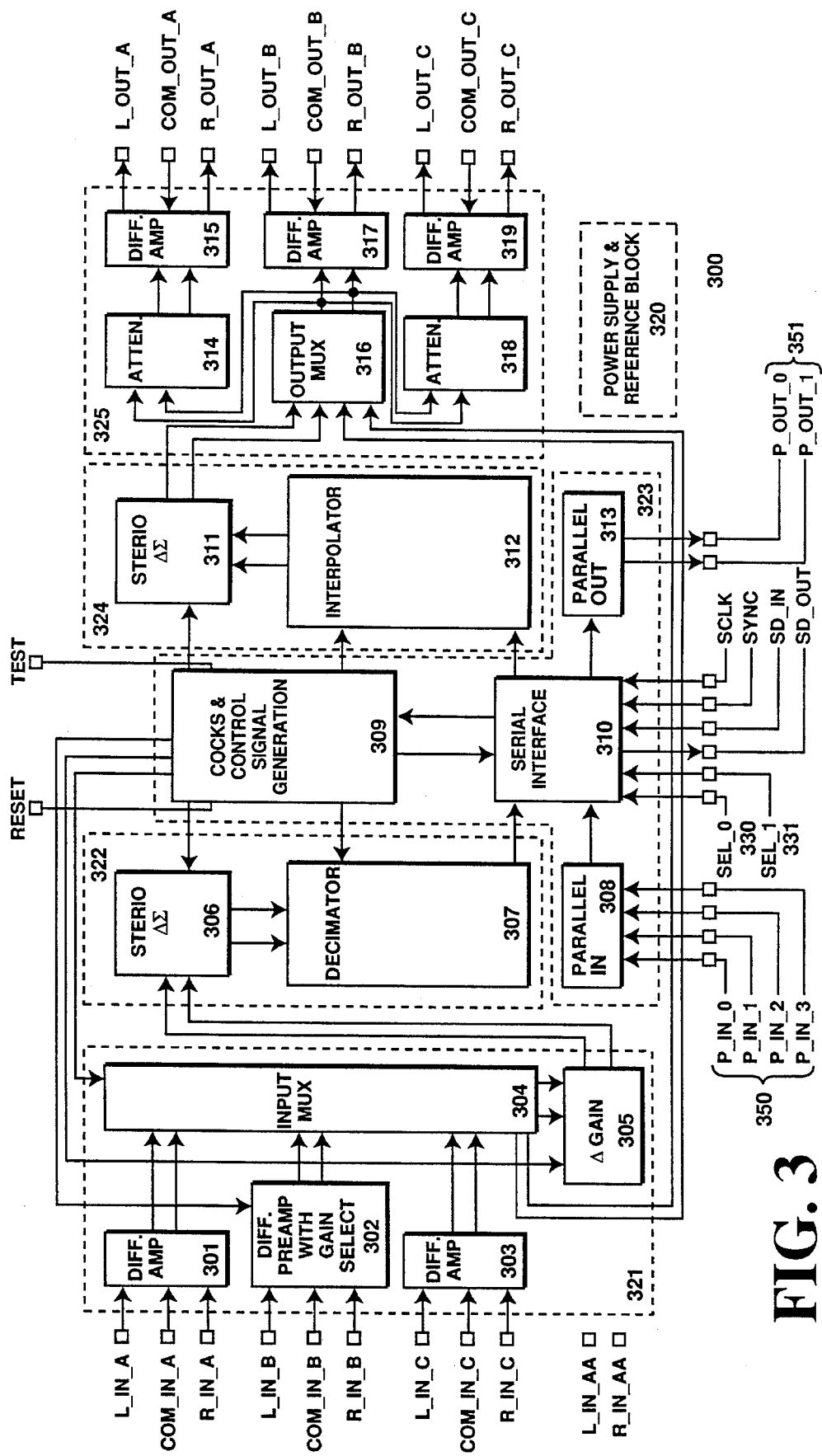
FIG. 3 is a block diagram of the audio data converter of the present invention.

FIG. 3 is a block diagram of one embodiment of a stereo audio converter subsystem for use in the computer system of the present invention. Referring to FIG. 3, the converter 300 contains six main functional units: a power supply 320, an input block 321, an analog-to-digital (A/D) block 322, a serial interface & control block 323, a digital-to-analog (D/A) block 324 and an output block 325, as shown using dotted-lines. In one embodiment, converter 300 comprises one or more integrated circuits.

In the present invention, the converters operate at multiple sampling frequencies and the decimation and interpolation filters track the sample rate. The effective sampling frequency for the converter 300 is set by one of its inputs. In the present invention, the effective sampling frequency is set by the Serial Bit clock (SCLK) alone, which is one of the four wires coupling the audio data converter 300 to the SIO 201. In another embodiment, the effective sampling frequency may be set using both the serial bit clock SCLK and a separate master clock in conjunction with on-chip rate control logic. For more information on the setting the effective sampling frequency using the serial bit clock SCLK and a master clock, see U.S. patent application Ser. No. 08/881,842, entitled "Multiplexed Digital Audio and Control/Status Serial Protocol," filed May 12, 1992, assigned to the corporate assignee of the present invention and incorporated herein by reference.

Absent a separate master clock input, the SCLK input functions as the master clock. In one embodiment, the ratio between the SCLK input and the effective sampling rate is fixed at 256 to 1. In the preferred embodiment, the filters and converters operate over an effective sample rate range of 7.2 kHz to 48 kHz, corresponding to a SCLK input in the range of 1.8432 MHz to 12.288 MHz.

The input block 321 contains five components: three "pseudo-differential" stereo input stages 301–302, a stereo multiplexer (MUX)/signal switching block 304 and a stereo gain block 305. Differential input stage A01 is coupled to receive left and right channels (L_IN_A and R_IN_A respectively) of audio input from source A, along with a common input, referred to as COM_IN_A. Differential input stage 301 generates two outputs, one each for the left and right channels of input source A, which are coupled to input MUX 304. Differential input stage 302 is coupled to receive left and right channels (L_IN_B and R_IN_B respectively) of audio input from source B, along with a common input, referred to as COM_IN_B and a gain select signal from clocks and control signal generation block 309.

Differential input stage 302 generates two outputs, one each for the left and right channels, which are coupled to input MUX 304. Differential input stage 303 is coupled to receive left and right channels (L_IN_C and R_IN_C respectively) of audio input from source C, along with a common input, referred to as COM_IN_C. Differential input stage 303 generates two outputs, one each for the left and right channels, which are coupled to input MUX 304.

The inputs are designated as "pseudo-differential" because there is only one ground reference for both channels. The source of these inputs may be another audio device or transducer, or other audio information supply.

MUX 304 receives the outputs of the input stages and connects the 3 sets of stereo inputs with 2 sets of stereo outputs. In one embodiment, MUX 304 functions as an input source selector, as opposed to dynamically switching between inputs. The input selection is controlled by a set of 4 bits in the serial data stream of converter 300 (which will be described later below).

After the input signals have passed through the input MUX 304, the input signals are run through a pair of antialias filters (one for each channel) prior to being input into A/D block 322. In one embodiment, these filters are external in that they utilize bypass capacitors that are located off chip.

A first pair of outputs from the Input MUX block 304 (MUX_LEFT and MUX_RIGHT) are sent into input gain block 305. A second set of outputs (LOOP_THROUGH_LEFT and LOOP_THROUGH_RIGHT) represent a gated version of the output of MUX 304. These auxiliary signal output pair are mixed into the D/A analog outputs.

The stereo input gain block 305 performs system level matching, thereby producing gain for each channel. In one embodiment, the gain for each channel is separately adjustable. As with the input source selection, the left and right channel input gain values are controlled using the serial data stream, via the clocks and control signal generation block 309. The outputs of the stereo input gain block 305 are sent to the A/D block 322.

The A/D block 322 for the converter 300 performs analog-to-digital conversion of the data on its inputs. In one embodiment, A/D block 322 includes a delta-sigma modulator 306 in conjunction with a decimator 307 to provide the A/D conversion. The use of a delta-sigma modulator and a decimator to provide A/D conversion is well-known to those skilled in the art.

The D/A block 324 receives signals from the serial interface 310 and provides digital-to-analog conversion. In one embodiment, D/A block 324 includes stereo delta-sigma modulator 311 and interpolator 312. The interpolator 312 includes an interpolation filter which supplies an output to the delta-sigma modulator 311. The use of an interpolation filter and a modulator to provide digital-to-analog conversion is well-known in the art.

Since the noise spectrum output of the D/A modulators is non-white, on-chip anti-imaging filters are used to provide the necessary ultrasonic signal attenuation. These filters may be switched capacitor filters. These anti-imagining filters have not been shown to avoid obscuring the present invention.

The output block 325 serves as an interface between the D/A block 324 and the output pins. As shown in FIG. 3, output block 325 acts as an interface to three sets of output pins in this embodiment. The output block 325 provides two basic functions. The output block 325 provides output attenuation of the D/A signal (primarily used for level matching) and provides a set of differential output stages. As shown below, only two of the output paths, those corresponding to output groups A and C shown in FIG. 3, have their own attenuator (e.g., 14 and 18 respectively). Note that these are also the output stages which may be muted under control of the serial bit stream. As with the A/D input level controls, the attenuation function of output block 325 is under the control of the serial bit stream. Each attenuator may be independently controllable. A third set of outputs, shown as output group B, is intended to act as a fixed level line output.

Each of the stereo output pin groups comprise a left/right pair and an associated ground (com) pin. In one embodiment, the output signals for each pair are referenced to the corresponding output ground pin (which is actually an input) and all inputs and outputs in this section are AC-coupled. This allows for compensation of differences between the AC audio ground reference of converter 300 and that of any external equipment which may be hooked up to a particular output pair. In one embodiment, one of the output pairs (set "A") is set up to double as a driver for headphones.

The Serial Interface/Control Block

The converter 300 of the present invention employs a serial port protocol. In one embodiment, the protocol can carry 8 channels of 20 bit sound data per frame, and 4 auxiliary channels for control and sense (one per stereo sub-frame). In this manner, the protocol of the present invention allows the internal functions of the stereo audio converter subsystem to be controlled without disrupting the flow of digital audio data or requiring a second serial control port.

Figure 4:
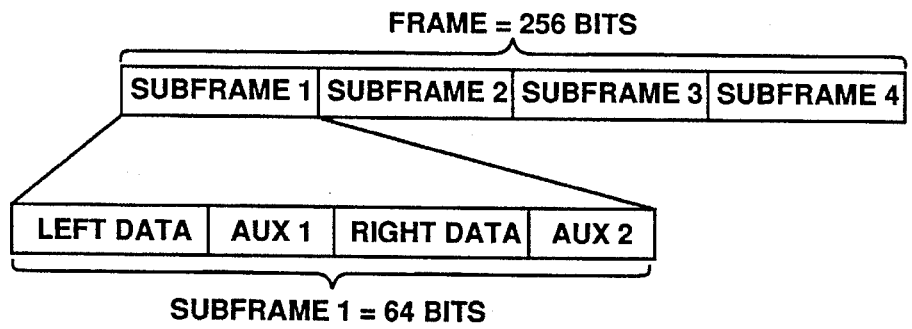
FIG. 4 illustrates the currently preferred embodiment of a frame transferred by the serial protocol.

The protocol of the present invention uses a 256-bit serial bit stream, referred to herein as a frame which is repeated once for each effective sample period. One embodiment of the serial data format of the present invention is shown in FIG. 4. It should be noted that converter 300 operates in "slave" mode, and its operation is synchronized by SYNC signal (which is produced by the serial bus master) that is sent on one of the four wires coupling the audio data converter 300 to the SIO 201.

In the present invention, each converter has pins 330–331 which are utilized to select which of the available subframes of the stereo data plus auxiliary controls/status in the bit stream should be used for communication with the audio data converter. In the currently preferred embodiment, each converter 300 has two pins. The two pins allow for up to four audio data converters to be coupled to SIO 201 (FIG. 2). The pins are set in either on/off configurations, each being unique to the audio data converter. It should be noted that any configuration or identification scheme could be used which allows the individual audio data converter to identify its particular subframe. If the converter has four converter pairs rather than two, then only a single pin is required to select the first two subframes or the last two subframes. A converter with eight converter pairs requires no subframe selection pins. The serial output and input lines for a converter are tri-state except during the subframe associated with the converter. Alternatively, the device may be able to switch between subframes according to control signals received over the serial interface.

The subframe during which the converter 300 is active is determined by the two pins, referred to herein as the SEL-I pin 331 and SEL-O pin 330. In one embodiment, the subframe for converter 300 is determined as follows:

SEL_I,SEL_O=00 subframe 0
SEL_I,SEL_O=01 subframe 1
SEL_I,SEL_O=10 subframe 2
SEL_I,SEL_O=11 subframe 3

In all other subframes, the serial interface of converter 300 is put into tri-stated and does not drive the serial output pins nor present an appreciable load on the serial input pins. Thus, the actual serial bit stream cells to which converter 300 responds is dependent on the setting of the SEL pins.

For instance, a set of subframe bits (numbered from 0 to 63) is defined that represent the bits which the converter will decode and produce. Thus, if the active subframe is set to 0, then the subframe bits 0 through 63 correspond to serial bit stream cells 0 through 63. If the active subframe for converter 300 is set to 2, then the subframe bits 0 through 63 correspond to serial bit stream cells 128 through 191. These subframe select pins will not change while the reset line is not asserted. In other words, the subframe select pins do not change while the converter 300 part is in operation.

In one embodiment, the effective sampling rate is determined solely by the serial port clock (i.e., there is no master clock signal) and the on-chip functions which are controlled by the serial bit stream may only be accessed through a special "expanded" data protocol. This "expanded data" is accessed when a master sets subframe bit 20 to a value of "1". At that point, the normal auxiliary serial data bit field is redefined to the "expanded mode" data format. In one embodiment, converter 300 implements a subset of the full "expanded data" serial protocol.

Converter 300 has digital input pins and output pins for inputting and outputting sense and control lines. In the currently preferred embodiment, each converter is equipped with any number of digital input pins and digital output pins. These pins are used to control output devices or to sense input conditions. Examples of I/O include the sensing of insertion of plugs into connectors, the sensing of "ring" and "off-hook" conditions (e.g. with regard to telephone connections), the controlling of speaker and headphone output amplifiers, the controlling of connections between local handsets and central office lines. These I/O pins are controlled and/or sensed by the serial port in SIO 201 (FIG. 2). Converter 300 also includes I/O pins for inputting and outputting audio data, shown as lines 350 and 351 respectively. In the currently preferred embodiment, each converter 300 also includes six I/O pins for inputting and outputting stereo audio data (two out shown as pins 341, four in shown as pins 340).

The Serial Port

The protocol of the present invention transfers data in a bit stream comprising successive frames of data. Each frame of data consists of multiple subframes. In the currently preferred embodiment, the protocol of the present invention utilizes a 64-bit data stream per stereo subframe and accommodates up to four subframes per frame. In the currently preferred embodiment, the 64-bits of data consists of 40 bits of stereo data (i.e., 20 left, 20 right, wherein the four least significant bits may be set to zero) and 24 bits of control (i.e., when data goes to the audio data converter) and status (i.e., when data is from the audio data converter)information.

To support the protocol of the present invention, SIO 201 (FIG. 2) uses four 32-bit shift registers for each serial port. Two of the registers are the data input and data output registers which hold the packed stereo data. In the currently preferred embodiment, the data is packed in left/right (L/R) format. The other two registers are the control register and the status register which hold the control and status data respectively and are both serviced by SIO 201. The serial port of the present invention combines the contents of the control and data output register to create the bit stream going to converters 204–207 and accepts incoming data into the data-in and status registers. The control register changes infrequently, and the status register is examined by the computer system only when a change of status occurs. Some bits in the status register may be used to generate an interrupt (e.g., error flag, overflow bits, etc.). The audio L/R data, on the other hand, comprises a real-time bit stream and is moved via DMA or under processor control to and from sound input and output buffers respectively in the system memory.

In one embodiment, the audio converter control register contains information for controlling the function of the audio data converter corresponding to the 24 bits of auxiliary data (i.e., control data) that is appended to the audio data being transmitted to the audio data converter. This information may be used to cause the audio converter to adjust gain settings, input selector settings, mute, etc. The auxiliary data may be loaded into the audio converter control register by the host or processor. The values stored in this register change infrequently and are repeated in the output stream for every sample.

The host serial interface receives the 24 bits of auxiliary data (i.e., status data) from the converter. In response to a change in the status data from its previous value, the SIO channel may generate a maskable interrupt. The data received remains the same (i.e., static) for long periods. When an error occurs, such as an overflow in the A/D subsystem of the converter or when one of the bit input lines changes state, the status data may, and typically does, change.

Additional registers may be included to provide control information or status information regarding other functionality or hardware structure in an audio device.

Serial Port Protocol

The currently preferred embodiment of the present invention interconnects an audio processing system through the serial port to audio data converters (i.e., converters 204–207) using four signal lines. In the currently preferred embodiment, the four signal lines translate into 4-pins interconnecting up to eight audio channels. The serial protocol of the present invention utilizes the four pins for all I/O functions. The four pins consist of a clock pin, a synchronization pin, a serial data-in pin and a serial data-out pin. All control and status functions are accessed using these pins. Thus, the four pins provide a means for exerting control and reading status, a means for setting the sample rate for the converters in the sound subsystem, provide simplified interconnect to industry-standard devices, and include substantial expansion capabilities for the future.

The data transferred from the serial port is formatted into frames. In the currently preferred embodiment, each frame is 256-bits long. Each frame is divided into four 64-bits subframes, each subframe being a stereo pair. In the currently preferred embodiment of the present invention, each subframe contains two 20-bit stereo audio data values (40 bits total), indicated as Left Data and Right Data, plus a 24-bit auxiliary field. An example of the currently preferred embodiment of a frame of the present invention is shown in FIG. 4. In the currently preferred embodiment, the sound data is formatted with the most significant bit (MSB) first, including trailing zeros when full resolution is not available (e.g., when only 16 of the 20-bits is being used).

Figure 5:
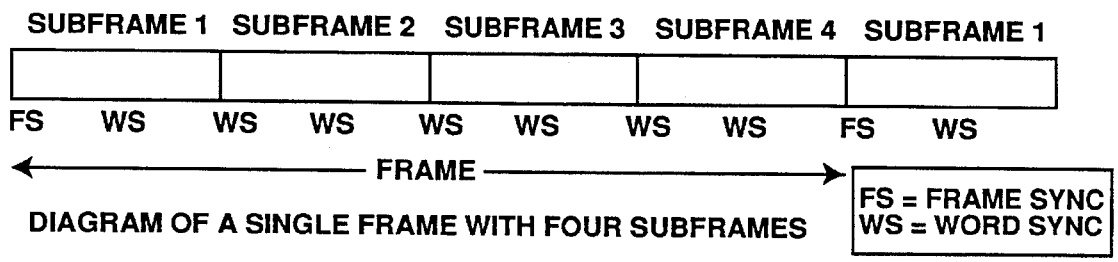
FIG. 5 illustrates the frame and subframe synchronization for the present invention.

Referring to FIG. 5, each word start in the bit stream is indicated by a word synchronization (WS). Actually, there is a word synchronization in the beginning and middle of the subframe. Note that a frame synchronization (FS) is also a word synchronization. The diagram of the subframe is shown in FIG. 5.

As stated earlier, in the currently preferred embodiment, the data output from this system carries up to 20 bits of audio data per subframe (40 bits total) and a 24 bit of auxiliary data. The 24 bits of auxiliary data output is control data, for such things as input selection, mute, input gain, output attenuation, bit I/O unit outputs, and extension bits. The 24 bits of auxiliary control data are separated into two sections, indicated as AUX1 and AUX2. The data input from each converter carries the same audio format, but the 24 bits of auxiliary data are used for status, including revision number, bit I/O unit inputs, valid data bits, overflow bits, error codes and expansion bits. The combination of AUX A and B form the 24-bit auxiliary datum for the subframe. Note that each subframe has its own auxiliary data as well as its own sound data. In the currently preferred embodiment, the serial data is carried on four digital lines defined as follows:

S_Clock: Serial clock; input to converter. In the currently preferred embodiment, the negative transition indicates data change and the positive edge is the sampling edge. Furthermore, the serial clock always runs at 256 times the sample rate.

Figure 6:
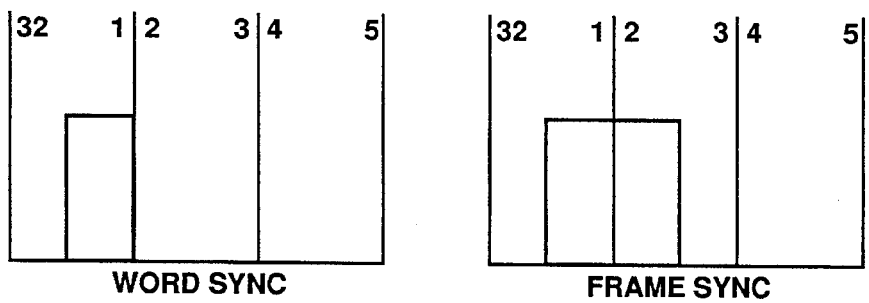
FIG. 6 illustrates the data synchronization pulse of the currently preferred embodiment of the present invention.

S_Sync: Serial data synchronization (sync); input to converter. This S_Sync signal is used to indicate the start of a word or a frame. It should be noted that a frame start is also a word start. In the currently preferred embodiment, the S_Sync signal line is normally low and transitions high for two bit cells at the beginning of a frame or one bit cell at the beginning of a word other than the first word in a frame. A diagram of each type of synchronization pulse is shown in FIG. 6. Referring to FIG. 6, the numbers shown above are the bit numbers for the word. Cell 1 is always MSB of the sound data in this format, and bit 32 is the last bit of the auxiliary data. The converter produces an error code if any other format sync is detected. In addition to producing an error code, the output is automatically muted.

S_Din: Serial D/A data in; input to converter: Each converter only responds to the selected subframe and ignores data in other subframes. It should be noted that more than one converter can receive data from the same subframe. Each 64-bit subframe (two words) has the following internal structure:

Word A
  subframe cells 0–19 for Left D/A data.
  subframe cells 20–31 for Auxiliary Control A data.
Word B
  subframe cells 32–51 for Right D/A data.
  subframe cells 52–63 for Auxiliary Control B data.

The Auxiliary Control A and B data is concatenated to produce a 24-bit field. These bits are used to specify control for each of converters 204–207. Auxiliary cell 1 is an expand bit and is used to indicate whether the protocol of the present invention operates in a normal mode or an expanded data mode. In one embodiment, if the expand bit is a 0, then the protocol operates in normal mode, while if the expand bit is a 1, then the protocol operates in expanded data mode.

S_Din in Normal Mode

When in normal mode, the 24-bit field in each 64-bit subframe received on the S_Din digital line is encoded as follows:

Auxiliary cell 1 (subframe cell 20): Expand bit. The expand bit is set to 0. If a 1 is detected by a device that is not configured for nor recognizes the expanded data mode, then all other auxiliary control bit cells are ignored, error bits are generated in the status auxiliary bits, and the audio processing continues as usual.

Auxiliary cell 2 (subframe cell 21): Mute. In the currently preferred embodiment, a logical value of 1 causes a "soft mute" of the D/A output. The mute bit also acts as a "reset" condition on the A/D valid counter so that mute can be used when changing sample rates.

Auxiliary cells 3, 4 (subframe cells 22, 23): Input select. In the currently preferred embodiment, the auxiliary cell 3 controls the 2-to-1 input multiplexors for the left channel, and cell 4 controls the multiplexors for the right channel (value 0 for input 1, value 1 for input 2).

Auxiliary cells 5 to 8 (subframe cells 24 to 27): Left Input Gain. In the currently preferred embodiment, the auxiliary cells 5 to 8 set the gain value of the left A/D input from 0 to 22.5 db in 1.5 db steps, wherein a hex value of 0 equals a gain of 0 db, and a hex value of F equals a gain of 22.5 db. In the currently preferred embodiment, the bits are transferred MSB first.

Auxiliary cells 9 to 12 (subframe cells 28 to 31): Right Input Grain. In the currently preferred embodiment, the auxiliary cells 9 to 12 set the gain value of the right A/D input from 0 to 22.5 db in 1.5 db steps, wherein a Hex value of 0 equals a gain of 0 db, and a hex value of F equals a gain of 22.5 db. In the currently preferred embodiment, the bits are transferred MSB first.

Auxiliary cells 13 to 16 (subframe cells 52 to 55): Left D/A output attenuation. In the currently preferred embodiment, auxiliary cells 13 to 16 set the attenuation value for left D/A output from 0 to 22.5 db in 1.5 db steps. In the currently preferred embodiment, a Hex value of 0 indicates that there is to be no attenuation while a hex value of F indicates an 22.5 db. In the currently preferred embodiment, the bits are transmitted MSB first.

Auxiliary cells 17 to 20 (subframe 56 to 59): Bight D/A output attenuation. In the currently preferred embodiment, auxiliary cells 17 to 20 set the attenuation value for right D/A output from 0 to 22.5 db in 1.5 db steps. In the currently preferred embodiment, Hex value of 0 means no attenuation, while a hex value of F means an attenuation of 22.5 db. In the currently preferred embodiment, the bits are shipped MSB first.

Auxiliary cells 21 to 24 (subframe cells 60 to 63): Output control. In the currently preferred embodiment, auxiliary cells 21 to 24 control four output (digital) pins on the converter. In the currently preferred embodiment, a logical value of 1 results in a high output, and a logical value of 0 results in a low output. In the currently preferred embodiment, after the power-up sequence, these four bits are initialized to zero.

S_Din in Expanded Mode

When in expanded data mode, the 24-bit field in each 64-bit subframe received on the S_Din digital line is encoded as follows:

Auxiliary cell 1 (subframe cells 20): Expand bit. In the expanded data mode, the Expand bit is 1.

Auxiliary cell 2 (subframe cell 21 ): Command bit. In the expanded data mode, the Command bit that follows immediately after the Expand bit in the serial bitstream indicates whether the "expanded mode" message is a data request (subframe bit 21=0) or a data command (subframe bit 21=1).

Auxiliary cells 3 to 12 (subframe cells 22–31 ): Expanded Mode Address. In the currently preferred embodiment, auxiliary cells 3 to 12, which immediately follow the Command bit, indicate the expanded mode data register address. Note that in another embodiment, more or less bits may be used to address a data register within the converter.

Auxiliary cells 13 to 24 (subframe cells 52 to 63): Expanded Mode Data. For a data command message (e.g., a expanded mode data register "write"), the actual data is supplied to the converter in subframe bits 52 through 63 is for updating the internal data register specified by the address in subframe bits 22–31. For a data request message (e.g., an expanded mode register data request), bits 52 through 63 are ignored by the receiving converter.

S_Dout: Serial A/D data out; output (tri-state) from converter. The converter only drives the S_Dout line during the subframe to which it is assigned and tri-states during the other subframes. Thus, only one converter may drive a given subframe. Once again, in the currently preferred embodiment, each 64-bit subframe (two words) has the following internal structure:

Word A
    subframe cells 1–20 for Left A/D data.
    subframe cells 21–32 for Auxiliary Status A data.
Word B
    subframe cells 33–52 for Right A/D data.
    subframe cells 53–64 for Auxiliary Status B data.

The Auxiliary Status A and B data are concatenated to produce a 24-bit field for status from the converter (e.g., converters 204–207). An extend bit is used to indicate whether the protocol of the present invention operates in a normal mode (e.g., extend bit is 0) or an extended data mode (e.g., extend bit is 1). It should be noted that the expand bit and the extend bit provide the same indication as to the current mode of operation, except one (e.g., the expand bit) is used in the auxililary data with data being sent from the audio unit and the other (e.g., the extend bit) is used in the auxililary data for data being received by the audio unit. Therefore, the extended and expanded modes are the same except for the direction of the data flow. In one embodiment, an audio converter may be able to receive and understand expanded mode information on the S_Din pin, but only responds using the normal mode on the S_Dout pin. It is the responsibility of the host to differentiate the types of responses.

S_Dout in Normal Mode

When in normal mode, the 24-bit field in each 64-bit subframe received on the S_Dout digital line is encoded as follows:

Auxiliary cell 1 (subframe cells 21): Extend bit. In the normal mode, the extend bit is zero. Note that if the extend bit is 1 and is received by a device which is not configured or does not recognized the expanded data mode, then an error is indicated by the device.

Auxiliary cell 2 (subframe cell 22): A/D Valid Data. In the currently preferred embodiment, a logical value of 1 indicates valid A/D data, and a logical value of 0 indicates invalid data. The auxiliary cell 2 is used to indicate that the A/D has completed initialization following power up or rate change. This valid data indication is set to "0" until enough clocks have passed since the last reset for the A/D to produce valid data (e.g., the calibration cycle has completed and the full latency of the digital filters has passed). The A/D valid data is also used to indicate low power mode, or mute condition.

Auxiliary cell 3, 4 (subframe cells 23,24): A/D Overflow status (bit 3 for left, bit 4 for right). In the currently preferred embodiment, each of auxiliary cells 3 and 4 indicates that clipping is occurring in the A/D conversion and filtering process. In one embodiment, these bits are transmitted as a "1" when the A/D input has exceeded the allowable input range. In this case, the data returned from the A/D is fixed at the maximum amplitude in the dynamic range of the digitized signal (e.g., either $7FFF_{xhex}$ or $8000_{xhex}$ depending on whether the input signal is positive or negative).

Auxiliary cells 5 to 8 (subframe cells 25 to 28): Error Number. In the currently preferred embodiment, the error number is zero, thereby indicating normal operation, unless an error condition exists. If an error condition occurs, then the number returned in this field reflects that for as long as the condition exists. In the currently preferred embodiment, bits are shipped MSB first. In the currently preferred embodiment, error conditions are:

1) S_Din auxiliary bit 1 is set; Invalid data in Expanded Data Mode. Error code=0001 (unable to understand control word). Data is still assumed to be valid.
2) Detection of an Alternate Format Sync pulse/Incorrect Frame Sync Pulse Format. Error code=0010 (unable to understand data format or lock onto frame sync). This automatically causes a mute of the analog output.
3) Serial clock frequency out of allowable range. Error code=0011 (serial clock out of range). This automatically causes a mute of the analog output. In another embodiment, Error code=0011–1111 are reserved for future error conditions.

The above list is only that of the currently preferred embodiment. Other error codes are possible.

Auxiliary cells 9 to 12 (subframe cells 29 to 32): Revision Number. In the currently preferred embodiment, the revision number is set to 0000. Future enhancements of the protocol should use other numbers. This will allow a SIO channel to adapt automatically to revisions. In another embodiment, the revision number is set to a value of "0010". Further revisions of the converter 300 should not affect this number unless the actual functionality changes (i.e., revisions of the converter in order to fix bugs should not affect this number).

Auxiliary cells 13 to 16 (subframe cells 53 to 56): Not used/Mfg. ID. In one embodiment, auxiliary cells 13 to 16 are reserved for future use and are set to 0000. In another embodiment, the Manufacturer's ID bit field (subframe bits 52 through 55)is set to a value to indicate the manufacturer of the part.

Auxiliary cells 17 to 20 (subframe cells 57 to 60): Not used. In the currently preferred embodiment, auxiliary cells 17 to 20 are reserved for future use and are set to 0000. These bits are ignored by the audio converter.

Auxiliary cells 21 to 24 (subframe cells 61 to 64): Input Sense: In the currently preferred embodiment, the input sense carries values (digital input port data) from the four (digital) input pins on the audio converter. In the currently preferred embodiment, a high voltage on one of the pins produces a logical value of 1, and a low voltage produces a logical value of 0.

S_Dout in Extended Mode

When in extended data mode, the 24-bit field in each 64-bit subframe received on the S_Dout digital line is encoded as follows:

Auxiliary cell I (subframe cells 20): Extend bit. In the extended data mode, this bit is set to 1. Note that if the extend bit is 1 and is received by a device which is not configured or does not recognized the expanded data mode, then an error is indicated by the device.

Auxiliary cell 2 (subframe cell 21 ): Valid bit. In the extended data mode, the Valid bit that follows immediately after the Extend bit in the serial bitstream indicates whether the "extended mode" data in auxiliary cells 13 to 24 (subframe cells 52 to 63)is valid data.

Auxiliary cells 3 to 12 (subframe cells 22–31): Extended Mode Address. In the currently preferred embodiment, auxiliary cells 3 to 12, which immediately follow the Valid bit, indicate the extended mode data register address of which status is being provided. Note that in another embodiment, more or less bits may be used to address a data register within the converter.

Auxiliary cells 13 to 24 (subframe cells 52 to 63): Extended Mode Data. In the currently preferred embodiment, the extended mode data represents actual status data from the internal data register specified by the address in subframe bits 22–31.

The present invention provides for allowing an audio and other nonaudio units that operate using the protocol of the present invention to accommodate changes in the protocol. When a change occurs to the protocol, such as a change in sync pulses, audio devices that cannot operate with the "changed" protocol can "disconnect" themselves, effectively, until a protocol that is understood reappears on the signal lines. At that time, each audio device is able to "reconnect" itself for operation in the system. For example, if the protocol is expanded to provide 32 channels instead of 8 channels, a three bit sync pattern may be used to send/receive data. Devices designed to operate according to a two bit sync pattern (a sync pattern other than 3 bits) will shut down until the protocol returns to one they recognize. This is controlled by the serial interface control currently in the audio units.

Note that the "Incorrect Frame Sync" error condition is not necessarily straightforward. If, for example, the audio converter 300 detects a set of Frame Sync pulses that violate the norm, then it is not clear where the Error bits (or any other bits) should be transmitted in the serial output data stream. Thus, this error is reported back to the host only after an audio functional unit has returned to normal operation. During the time that the audio functional unit is unable to determine the correct position in the frame, the serial port output is put into a tri-stated mode. Note that the parallel outputs are not affected by a serial port error condition and maintain their state unless they are explicitly changed or if a hard reset occurs. The sequence for an invalid Sync signal is as follows:

1) The audio functional unit detects an incorrect Sync pattern (either too many or too few) Frame Sync or Word Sync pulses in a frame or incorrect Frame Sync pulses (e.g., a Frame Sync pulse that lasts for more than 2 bit periods).

2) At the end of the currently active subframe, the S_Dout pin goes into a tri-stated mode. Output Mutes are automatically enabled.

3) The internal "A/D Data Valid" indicator is set to "0".

4) The audio functional unit detects a return to the correct Sync format.

5) On the next active frame (not the next active subframe), the audio functional unit returns the S_Dout pin to the normal (transmitting) condition and transmits a subframe with the "A/D Data Valid" indicator set to "0" and the Error bit field set to "0010".

6) On the next active frame (in the second frame after the correct Sync format has been first observed), the "Error" bit field should return to "0000" (assuming that no other error conditions are pending). If the A/D data is ready to be transmitted, then the "A/D Data Valid" indicator can be reset to a "1"; if not, then it remains at a "0" until the data is guaranteed to be valid.

7) Finally, the host begins a recalibration and then explicitly disables the appropriate output mute(s).

In one embodiment, when the audio converter 300 is brought out of the reset state (either a power-on "cold" reset or a "warm" reset), there is no guarantee that the SCLK signal will be stable or even active. In the case of a serial port error, the bus master initiates a recalibration of the audio converter 300 once it receives an error message from the audio converter 300. If the host is explicitly causing a serial port reset (for example, when changing the sample frequency), the audio converter 300 recalibrates to maintain optimal performance.

Note that in order to interconnect a converter utilizing either protocol to the system, the same four lines may be used. Also note that by using differing sync pulse formats, such as three bit wide or more sync pulses, the protocol may be further expanded in the future without obsoleting current generation parts.

The Expanded Data Mode Operation

The "expanded data mode" serial data transmission in the present invention is an address/data protocol. Each subframe is capable of providing address and data information during a transfer on the serial data interface. A control register for controlling one or more functions of the audio unit (e.g., chip) may be controlled by setting bits in the register. The setting of bits is accomplished by performing a write operation to the register. Each register is mapped to an address. The protocol of the present invention allows for specifying the address of a control register in the functional unit and sending data to be written to or to update the register. Similarly, using the same address, the present invention allows for the current state of a control register to be requested and obtained using its mapped address. An audio unit responding to either the data register write command or the data register request can specify the address as well as data in its reply to provide status or data requested by or regularly sent to the requesting (or master) unit.

For a command message (e.g., an expanded mode data register "write"), the data register in the audio data converter responsible for controlling the operation of audio data converter 300 specified by an address in the first portion of a subframe is supplied with the actual data being supplied to the audio data converter 300 in subframe bits 52 through 63. If the "command" bit is set to a value of "1", then the appropriate internal register in the receiving chip is updated to the new data value on the following frame boundary.

For a data request message (e.g., a expanded mode register data request), a data register in the audio data converter is specified by the address bits in subframe bits 22 through 31 to provide status information to a requesting, while bits 52 through 63 are ignored by the receiver. With the command bit set to a "0", the receiver responds in the following frame with the requested data in the serial data output stream. The output bit stream "extended data" address bits (subframe bits 22 through 31) echo the data address specified in the register data request, confirming that the audio converter retrieved the correct data. As in the case of the command bit being set to a value of 0, if the receiver is not capable of responding correctly to the expanded mode command, then it reports back an error code of 1 without going into the "extended" serial mode.

Therefore, with request to a data request message, a host may send out an address and a response specifying the desired data to the address location requested is made thereafter. The present invention allows a host to have multiple status requests pending at the same time. The multiple requests may be satisfied out-of-order. That is, the host may receive responses to its multiple requests in an order different than the order in which the requests were made. In this manner, requests may overlap with other responses. Thus, the protocol of the present invention permits split transactions to be performed in the audio (computer) system.

In the present invention, the serial bus master permits only one "expanded mode" message to be active at any one time. If the receiver cannot respond correctly to the data request, then it returns an error code of 1 without going into in the "extended" serial mode. This occurs, for instance, when a register is accessed which does not exist in the receiver. In one embodiment, an error code of 1 is returned by setting subframe bits 24–27 to 0001. Note that in such a case of an "expanded mode" data error, then the output is not muted, as is the case with a more serious error, such as error number 2, which occurs when the receiving part detects an incorrect frame sync pattern.

Thus, the expanded data mode protocol allows audio units and their associated functionablity to be controlled through the use of a register data set on the chip. The set of register mappings (to address) is dependent on the chip. By addressing each register directly, a portion of the functionablity on the chip may be controlled. Using the address/data format allows any audio units and devices to make use of the protocol of the present invention. For instance, other devices that have a variety of different functions may be coupled using the serial protocol. For example, an MPEG chip, audio compression chip, sample rate conversion chips, etc. may be coupled and any control registers may be accessed to control functionability or provide status. As long as the sending device recognizes the receiving device, control and status information may be transferred. Each distinct device may be indentified through its manufacturer ID and/or its chip identifier.

Chip Control Bit Assignments of the Preferred Embodiment

Figure 7:
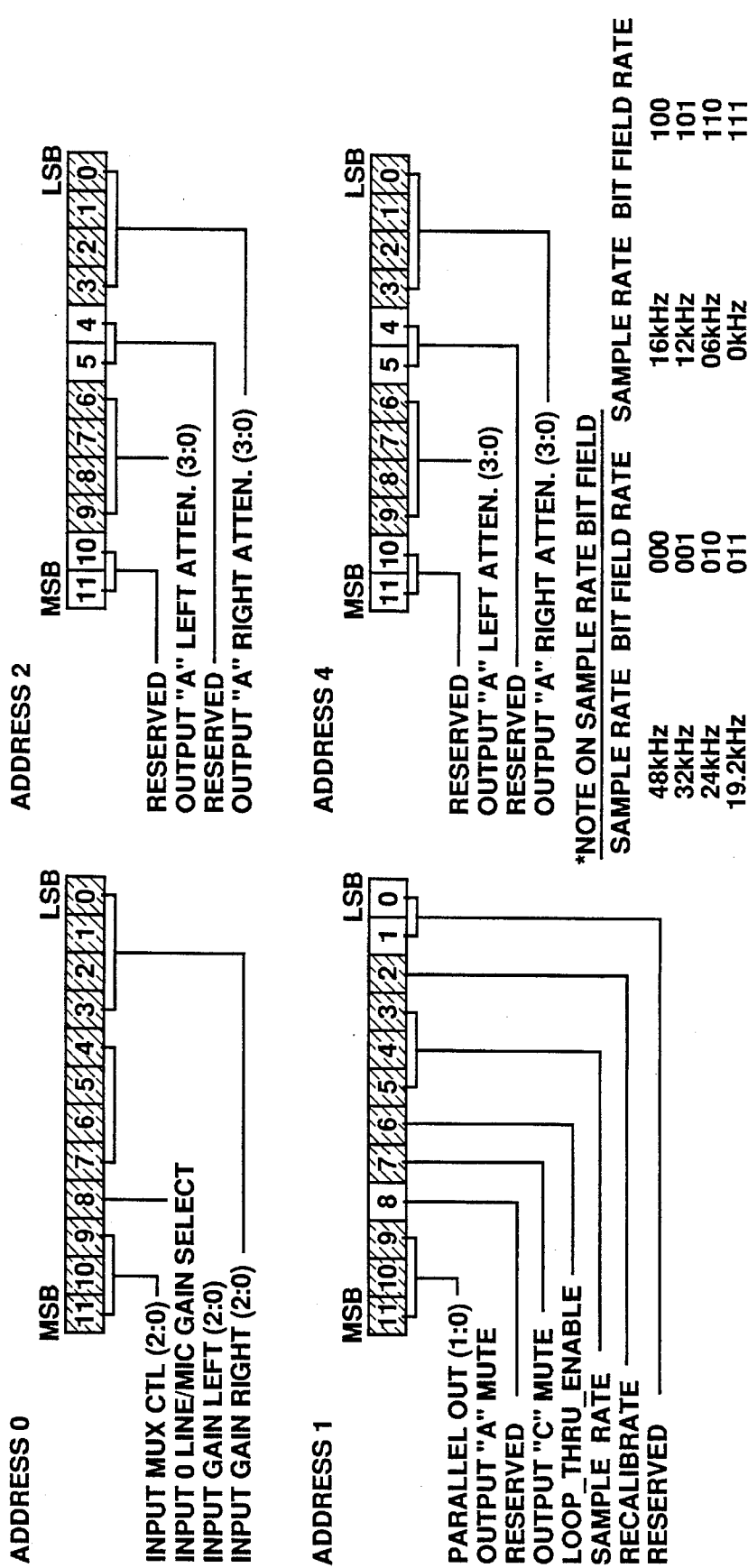
FIG. 7 illustrates one embodiment of the bit designations for the control data registers in the audio data converter.

In the present invention, all control functions for audio converter 300 are accomplished via the "expanded data" mode. The audio converter 300 ignores subframe bits 21 through 31 and 52 through 63 if the expand bit (subframe bit 20) is not set to a logical "1". The preferred embodiment of the expanded data mode control register address map of the present invention is shown in FIG. 7. Note that an attempted access to any other address in the preferred embodiment causes the audio converter 300 to generate a 1 in the error message bit field, but should otherwise be ignored. However, in other embodiments, other addresses may be used to access other control functions available on other audio functional units depending on the registers in the units and address mapped to their locations.

Referring to FIG. 7, the data portion for address 0, 1, 2 and 4 are shown. The control register for input B is mapped to address 0. In one embodiment, the control register for input B includes a four bit field, each for setting the gain for the left and right channels of input A, B, or C, a three bit field for controlling the multiplexer to designate one of inputs A, B, or C, and a single bit field for selecting the microphone gain.

The control register for output A is mapped to address 2. In one embodiment, the control register for output A includes a four bit field for setting the attenuation of the left output channel and another four bit field for setting the attenuation of the right output channel for A, as well as four bits reserved for future use. The control register for output C is mapped to address 4, with bit locations designated in the same manner as address 2 and output A with locations for the attenuation settings of both left and right output channels for C.

Another control register is mapped to address 1 and controls multiple functions. The control register uses a two bit field to control the outputs, with one bit controlling each of the outputs. The control register also includes separate bit fields for causing a "soft mute" of the D/A output for output A and output C, wherein a logical 2 indicates a mute condition.

Another bit field is a "Sample Rate" bit field, which is a software indication to the audio converter 300 of the frequency range for the effective sample rate. In one embodiment, these bits may be ignored. For example, audio functional units with independent on-chip digital clock generation may use this information to optimize the performance of the chip for the particular effective sample rate at which the part is currently operating.

Also the "recalibrate" field may be ignored by the audio unit for units guaranteed to perform at the full specification level at all times with the digital output from the A/D being DC-free under all normal operating conditions. If the unit does support recalibration upon demand, then it will attempt to optimize its internal operation (to zero out DC-off-set, for example) on a transition of this bit from a 0 to a value of a 1. This bit is write-on, in that if a calibration cycle is initiated by the host, the unit returns a value of "0" in the "A/D valid" field while the recalibration is in progress. After calibration has been completed, the "A/D valid" bit automatically returns a value of "1"

A couple of bits are reserved for future use.

Once the control information has been received by the audio data converter 300, any change designated to take effect does not until the beginning of the following active subframe. Therefore, there is a slightly less than one frame time latency between when the data is received and when the control registers of audio data converter 300 are updated. In one embodiment, all of the bits inside each of the control registers inside the audio data converter 300 are updated simultaneously to prevent data skew problems.

An address is set aside at FFhex for a manufacturer-specific register. Note that this register is not all ones. The register location is set aside for production testing purposes and is not read from nor written to by the host in normal operation.

Audio Converter Status Bit Assignments

To report its status to the serial bus master, the auxiliary data field is transmitted once every frame during the portion of the active subframe which does not carry audio signals (subframe bits 20 through 31 and subframe bits 52 through 63).

In one embodiment, the audio converter 300 also implements only a subset of the full "expanded data mode" operation. Specifically, in this case, audio converter 300 does not respond to expanded mode data requests, as indicated by the "command" bit set to a 0. Also audio converter 300 does not respond back to the serial bus master with an "extended mode" message to acknowledge receipt of an "expanded mode" command. If audio converter 300 is not capable of responding to an "expanded mode" data message, it simply returns an error code of 1 (0001) in subframe bits 24 through 27 respectively. This same error code is also returned for all data request messages. If an expanded mode command is received correctly, then the audio converter 300 returns an error code of "0" in the following frame. In other words, the audio converter 300 never produces an "extended data mode" message; it only generates "normal" status data in its serial bit stream output.

Note that with the normal status information, such as the input clipping indicators, parallel digital input bits and the error codes are returned. Thus, all normal status information from the converter 300 is returned via the "normal" bit stream format, even though "expanded data" messages are used for all of the control functions of converter 300 and the "Extend bit" (subframe bit 20) is always transmitted as a "0".

In one embodiment, if a first audio unit capable of using the expanded data protocol receives an error message from another audio unit in response to a data request or command message sent by the first audio unit, the first audio unit recognizes that the audio unit cannot recognize the expanded data protocol and only recognizes the normal mode. In response to the error message, the first audio unit sends a data register write or request in the normal mode. Therefore, in one embodiment, the audio functional unit, such as audio data converter 300, is able to switch between the normal and the expanded data mode. This capability is very useful in systems employing devices capable of using only the normal mode. In such a case, these audio units are backward compatible. Note that even though the audio devices that employ normal mode do not understand the control information in the subframe, they still understand and may operate on the audio data in the subframe. The control information is just ignored. In this manner, the present invention allows these "normal mode" devices to be forward compatible.

In one embodiment, there are four parallel digital input pins on the converter. These pins will be used to sense various input conditions. For instance, these pins may be used to sense a condition such as whether or not there is something plugged into the headphones jack. As described above, subframe bit numbers 60 through 63 are used to transmit the state of these inputs back to the host. In one embodiment, these inputs are latched at the beginning of the active subframe. However, in other embodiments, these inputs may be latched at other times during a subframe. In addition, there are two parallel digital output pins on the audio converter 300. In one embodiment, the data for these outputs is updated at the beginning of the active subframe from the data received in the previous active subframe.

The present invention uses two data fields: one for an address and one for data. Because two data fields are used, data can be written in the same subframe. During a register data write, the address portion of the data is received first (in the first channel) in the serial bit stream by the receiving device, while the data is received later (in the second channel). Because of the temporal separation between the two, the time lag allows the register specified by the address to be set up by the time the data arrives. In this manner, the data can be written in a single subframe.

Moreover, by arranging the data format as described above, it is possible to connect the audio data converter of the present invention to bit streams designed to work with other industry-standard technology, with only a small amount of additional logic. Many standard parts use 32 clock periods to transfer data in a left-right order, with MSB transmitted first within each 32-bit field and zeroes filling unused bits. By properly setting the function of the auxiliary bits so proper operation results when all bits are zero, the data stream can be easily converted to match the requirements of the audio data converter.

As described previously, the protocol of the present invention allows for future expansion. The audio data is 20 bits, even though present audio conversion technology is limited to only 16 or 18 bits of accuracy.

The protocol of the present invention also reduces the number of pins required for both the audio processing system and the audio converter. By lowering the number of pins, the required die area is decreased, the package space is reduced, and the cost is reduced. Moreover, the present invention allows easy expansion of an audio system by simply adding additional audio converters to the existing serial port. The present invention also adds the ability to support multiple sample rates easily and with low cost. No additional switching circuitry is required, and all audio converter signal processing functions including antialiasing filters are programmed by the serial port rate. Also, the present invention has the ability to easily upgrade the functionality of the data converters into an audio system without having to modify the base sound subsystem.

It should be noted that a low-cost implementation of the SIO may be used to only support a single audio converter and one of the four subframes.

Whereas many alterations and modifications of the present invention will no doubt become apparent to a person of ordinary skill in the art after having read the foregoing description, it is understood that the particular embodiment shown and described by illustration is in no way intended to be limiting. Therefore, reference to the details of the preferred embodiments are not intended to limit the scope of the claims which themselves recite only those features regarded as essential to the invention.

Thus, a protocol for transferring audio data and control/status data between audio devices has been described.

I claim:

1. A method for transferring data between a first audio functional unit and a second audio functional unit, said method comprising the steps of:

combining audio data and a predetermined number of bits of auxiliary data, wherein the step of combining comprises the steps of setting the predetermined number of bits into one of a variable number of bit combinations to specify a transaction between the first audio functional unit and the second audio functional unit and formatting the predetermined number of bits of auxiliary data into at least one data structure having a first portion containing auxiliary data that specifies an address and a second portion containing auxiliary data that specifies data; and transferring the combined data on a first connection, such that the combined data is transferred from the first audio functional unit to the second audio functional unit.

2. The method defined in claim 1 wherein the auxiliary data comprises status information.

3. The method defined in claim 1 wherein the auxiliary data comprises control information.

4. The method defined in claim 1 wherein the step of transferring includes transferring the combined data according to a clock.

5. The method defined in claim 4 further comprising the step of supplying the clock on a second connection.

6. The method defined in claim 1 wherein the step of transferring includes transferring the combined data according to a synchronization signal.

7. The method defined in claim 6 further comprising the step of supplying the synchronization signal on a second connection.

8. The method defined in claim 1 wherein the auxiliary data specifies a command, and wherein the first portion contains a data register address and the second portion contains data associated with the command message to enable the second audio functional unit to perform the command.

9. The method defined in claim 1 wherein the auxiliary data specifies a data request, and wherein the first portion contains a data register address to enable the second audio functional unit to satisfy the data request.

10. The method defined in claim 1 wherein the auxiliary data specifies status information, and wherein the first portion contains a data register address and the second portion contains status data.

11. A method for transferring data between a first audio functional unit and a second audio functional unit coupled using a plurality of connections, said method comprising the steps of:

combining audio data and a predetermined number of bits of auxiliary data, wherein the step of combining comprises the steps of setting the predetermined number of bits into one of a variable number of bit combinations to specify a transaction between the first audio functional unit and the second audio functional unit and formatting the predetermined number of bits of auxiliary data into at least one data structure having a first portion containing auxiliary data that specifies an address and a second portion containing auxiliary data that specifies data; and transferring the combined data on a first connection according to a clock on a second connection and a synchronization signal on a third connection, such that the combined data is transferred from the first audio functional unit to the second audio functional unit.

12. The method defined in claim 11 wherein the step of combining comprises multiplexing the audio data and the predetermined number of bits into a plurality of bits.

13. The method defined in claim 12 wherein the step of multiplexing includes the step of formatting the combined data into at least one frame having a plurality of subframes, wherein each of the plurality of subframes comprises a pair of audio channels.

14. The method defined in claim 11 wherein the auxiliary data specifies a command, and wherein the first portion contains a data register address and the second portion contains data associated with the command message to enable the second audio functional unit to perform the command.

15. The method defined in claim 11 wherein the auxiliary data specifies a data request, and wherein the first portion contains a data register address to enable the second audio functional unit to satisfy the data request.

16. The method defined in claim 11 wherein the auxiliary data specifies status information, and wherein the first portion contains a data register address and the second portion contains status data.

17. The method defined in claim 11 further comprising the steps of:

combining audio data and a predetermined number of bits of auxiliary data, wherein the step of combining includes the step of setting the predetermined number of bits into one of a variable number of bit combinations to specify a transaction between the second audio functional unit and the first audio functional unit; and transferring the combined data on a fourth connection according to the clock on the second connection and the synchronization signal on the third connection, such that the combined data is transferred from the second audio functional unit to the first audio functional unit.

18. A method for transferring data between a first audio functional unit and a second audio functional unit coupled using a plurality of connections, said method comprising the steps of:

transferring multiplexed audio data and auxiliary data on a first connection according to a clock on a second connection and a synchronization signal on a third connection, such that the combined data is transferred from the first audio functional unit to the second audio functional unit, wherein the auxiliary data specifies an address and data associated with the address when one of the bits of the auxiliary data is set; and transferring multiplexed audio data and auxiliary data on a fourth connection according to the clock on the second connection and the synchronization signal on the third connection, such that data is transferred from the second audio functional unit to the first audio functional unit.

19. An audio system comprising:

a first audio functional unit;

a second audio functional unit; and an interface coupled between the first audio functional unit and the second audio functional unit, wherein the interface comprises a first conductor and a second conductor, wherein the first conductor transfers combined audio and auxiliary data from the first audio functional unit to the second audio functional unit and the second conductor transfers combined audio and auxiliary data from the second audio functional unit to the first audio functional unit, wherein the auxiliary data specifies an address and data associated with the address when one of the bits of the auxiliary data is set.

20. The system defined in claim 19 wherein the interface further comprises a third conductor for supplying a clock, wherein data is transferred between the first audio functional unit and the second audio functional unit according to the clock.

21. The system defined in claim 19 wherein the interface further comprises a fourth conductor for supplying a synchronization, wherein data is transferred between the first audio functional unit and the second audio functional unit according to the synchronization signal.

22. The system defined in claim 19 wherein the auxiliary data comprises status information.

23. The system defined in claim 19 wherein the auxiliary data comprises control information.

24. A method of performing data transactions between a plurality of audio functional units coupled using a plurality of connection paths, said method comprising the steps of:

transferring a plurality of status data requests multiplexed with audio data in a first plurality of subframes on one of the plurality of connection paths according to a clock on a second connection path and a synchronization signal on a third connection path, wherein each of the first plurality of subframes includes at least one of the plurality of status data requests and audio data, such that the plurality of status data requests are transferred in an order; and transferring a plurality of status data responses multiplexed with audio data in a second plurality of subframes on a fourth connection path according to the clock on the second connection path and the synchronization signal on the third connection path, wherein each the plurality of data responses comprises a response to one of the plurality of data requests, such that pairs of status data requests and data responses form transactions, and further wherein the plurality of data responses are not transferred in the order, such that split transactions are performed between the plurality of audio functional units.

25. A method for commuting between a plurality of devices coupled using first and second data lines, a clock signal and a synchronization signal, wherein one of the plurality of devices operates according to a first protocol and a second device operates according to a second protocol, said method comprising:

the first device initiating a transfer of multiplexed audio data and auxiliary data according to the first protocol;

the second device isolating itself from the first and second data lines, wherein the second device becomes unresponsive to transfers on the first and second data lines;

the second device recognizing a subsequent transfer made according to the second protocol; and becoming responsive to transfers on the first and second data lines.

* * * * *